United States Patent [19]

Kawasaki

[11] Patent Number: 5,625,647
[45] Date of Patent: Apr. 29, 1997

[54] TRANSMITTER HAVING AUTOMATIC LEVEL CONTROL FUNCTION

[75] Inventor: Toshio Kawasaki, Kawasaki, Japan

[73] Assignee: Fujitsu Limited, Kanagawa, Japan

[21] Appl. No.: 189,166

[22] Filed: Jan. 28, 1994

[30] Foreign Application Priority Data

Jul. 8, 1993 [JP] Japan .................... 5-169137

[51] Int. Cl.$^6$ .................................. H04L 27/08
[52] U.S. Cl. ................ 375/295; 332/107; 455/126; 455/115; 375/296
[58] Field of Search ...................... 375/308, 311, 375/329, 295, 296, 300, 285, 284, 281, 219, 345, 346, 298, 261, 287, 264; 455/126, 13.4, 297; 332/107, 115, 155, 156, 157, 159

[56] References Cited

U.S. PATENT DOCUMENTS

| | | |
|---|---|---|
| 4,675,880 | 6/1987 | Davarian .................... 375/298 |
| 5,113,525 | 5/1992 | Andoh ........................ 455/127 |
| 5,170,415 | 12/1992 | Yoshida et al. . |
| 5,247,542 | 9/1993 | Onodera et al. . |
| 5,265,127 | 11/1993 | Betts et al. . |
| 5,293,406 | 3/1994 | Suzuki ........................ 375/295 |

*Primary Examiner*—Wellington Chin
*Assistant Examiner*—William Luther

[57] ABSTRACT

A transmitter having an automatic level control function, which includes a modulator for modulating a carrier by a baseband signal, a variable attenuator for outputting a modulated wave controlled to a certain level, a detector for detecting the modulated wave, and a subtractor for controlling the gain of the variable attenuator in accordance with the difference in level between the detected output level and the reference level and also is provided with an operating unit for applying an operation for matching with the detection characteristic of the detector to the baseband signal for producing the reference level, whereby it is possible to prevent a peak with a large level from occurring at the head of the bursts when transmitting burst signals (modulated waves).

8 Claims, 7 Drawing Sheets

Fig. 1 (Prior Art)
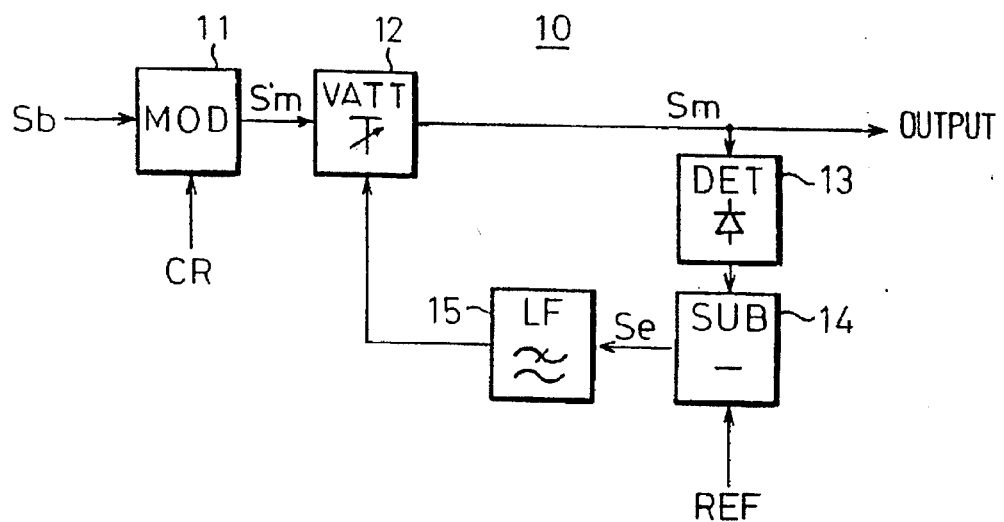
Fig. 2A (Prior Art)
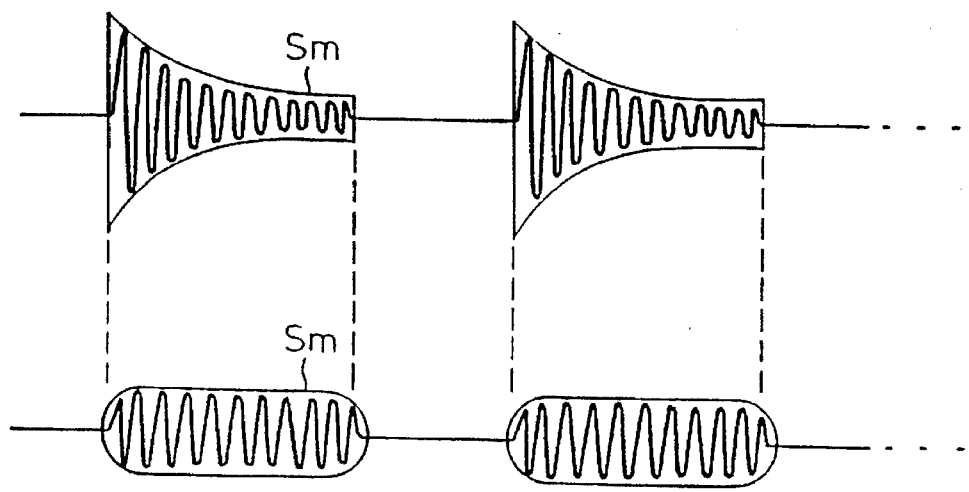
Fig. 2B

TRANSMITTER HAVING AUTOMATIC LEVEL CONTROL FUNCTION

BACKGROUND OF THE INVENTION

1. Field of the Invention

The present invention relates to a transmitter, more particularly to a transmitter having an automatic level control (ALC) function.

In recent years, the time division multiple access (TDMA) mode and other systems for communication not by continuous waves, but by burst signals, for example, radio satellite communication systems, have been offered for broad practical use.

In general, it is easy to perform automatic level control on a continuous wave, but as mentioned later, it is not easy to achieve accurate automatic level control all the time for burst signals. Accordingly, there is a desire for a transmitter which can perform accurate automatic level control even with respect to burst signals in the above-mentioned communication systems.

2. Description of the Related Art

As will be explained in detail later with reference to the drawings, a general transmitter having an automatic level control (ALC) function suitable for a continuous wave includes a modulator (MOD) for modulating a carrier (CR) by a baseband signal ($S_b$), a variable attenuator (VATT) for controlling the level of the modulated wave ($S'_m$) output from the modulator and outputting a modulated wave ($S_m$) with a predetermined transmission power, a detector (DET) for detecting the level of the modulated wave ($S_m$) output from the variable attenuator, a subtractor (SUB) for receiving as input the detected level output from the detector and the reference level (REF) corresponding to the predetermined transmission power and outputting an error signal ($S_e$) between these levels, and a loop filter (LF) for feeding back the error signal ($S_e$) to the variable attenuator with predetermined loop characteristics.

When this transmitter is handling burst signals, however, the head level of the burst signals suddenly increases. After this, stabilization is performed using a time constant of the loop filter.

To resolve this problem, the conventional transmitter, as mentioned later, was characterized by inserting an 0-th order sample hold circuit (SH) between the subtractor (SUB) and loop filter (LF). According to the conventional transmitter, as the output modulated wave ($S_m$) an ideal burst signal waveform is obtained with no head peak.

In this conventional transmitter, an ideal burst signal waveform having no head peak is obtained as the output modulated wave ($S_m$).

In this conventional transmitter, however, when the power is turned on or the non-signal period between burst signals becomes long, the desired burst signal waveform cannot be obtained as an output modulated wave and a head peak appears.

SUMMARY OF THE INVENTION

Accordingly, in consideration of the above-mentioned problem, the present invention has as its object the provision of a transmitter having an automatic level control function which can reliably prevent the occurrence of a peak of a large level at the head of the burst signals (modulated wave output).

To attain the above object, the present invention is provided with a modulator for modulating a carrier by a baseband signal, a variable attenuator for outputting a modulated wave controlled to a certain level, a detector for detecting the modulated wave, and a subtractor for controlling the gain of the variable attenuator in accordance with the difference in level between the detected output level and the reference level and also is provided with an operating unit for applying to the baseband signal an operation for matching with the detection characteristic of the detector for producing the reference level.

BRIEF DESCRIPTION OF THE DRAWINGS

The above object and features of the present invention will be more apparent from the following description of the preferred embodiments with reference to the accompanying drawings, wherein:

FIG. 1 is a view showing a general transmitter having an automatic level control function suitable for a continuous wave;

FIGS. 2A and 2B are waveform diagrams for explaining the modulated wave in FIG. 1;

DESCRIPTION OF THE PREFERRED EMBODIMENTS

Figure 3:
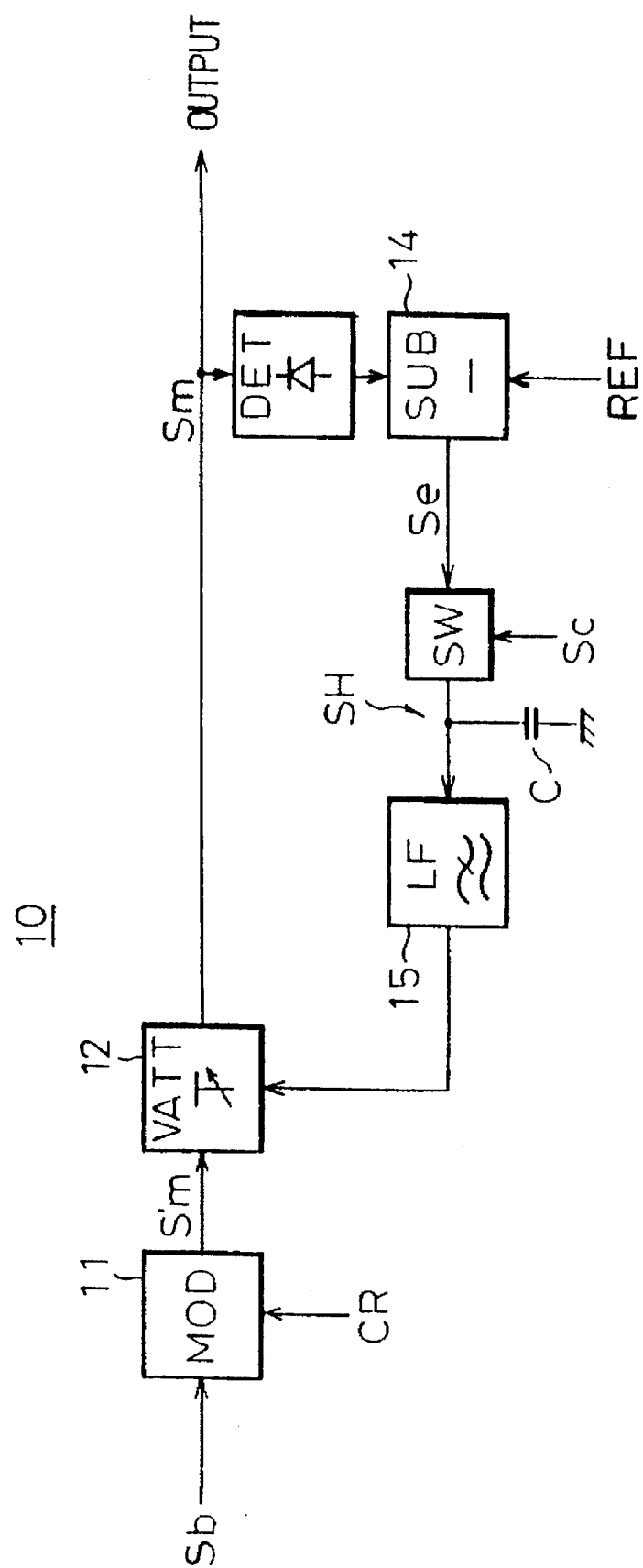
FIG. 3 is a view showing an example of a transmitter having an automatic level control function in the related art.

Before describing the embodiments of the present invention, the related art and the problems therein will be described with reference to the related figures.

FIG. 1 is a view showing a general transmitter having an automatic level control function suitable for a continuous wave. As shown in the figure, a transmitter 10 having an automatic level control (ALC) function suitable for a continuous wave includes a modulator (MOD) 11 for modulating a carrier CR by a baseband signal $S_b$, a variable attenuator (VATT) 12 for controlling the level of the modulated wave $S'_m$ output from the modulator 11 and outputting a modulated wave $S_m$ by a predetermined transmission power, a detector (DET) 13 for detecting the level of the modulated wave $S_m$ output from the variable attenuator 12, a subtractor (SUB) 14 for receiving as input the detected level output from the detector 13 and the reference level REF corresponding to the predetermined transmission power and outputting an error signal $S_e$ between these levels, and a loop filter (LF) 15 for feeding back the error signal $S_e$ to the variable attenuator 12 by predetermined loop characteristics.

FIGS. 2A and 2B are waveform diagrams for explaining the modulated wave in FIG. 1. FIG. 2A shows the modulated wave $S_m$ in the case where the transmitter 10 sends burst signals. As shown in FIG. 2A, when handling burst signals, the head level of the burst signals ends up rapidly increasing. After this, stabilization is performed using a time constant of the loop filter 15.

The reason why the head level of the burst signals increases rapidly is that in the non-signal period between burst signals, feedback is applied so that the gain of the variable attenuator 12 becomes maximum.

If a modulated wave having the waveform shown in FIG. 2A is output, not only does the power consumption of the transmitter 10 become great, but also for an instant at the head, the frequency band becomes broader, which is not desirable. Therefore, it is demanded that the burst signal waveform as shown in FIG. 2A become a burst signal waveform without a peak as shown in FIG. 2B.

FIG. 3 is a view showing an example of a transmitter having an automatic level control function in the related art. In this figure, the characteristic feature is that the 0-th order sample hold circuit SH is inserted between the subtractor 14 and loop filter 15. The circuit SH is constituted for example by a switch SW and a capacitor C. The switch SW is turned on and off by the control signal $S_c$. The control signal $S_c$, referring to FIGS. 2A and 2B, is a signal which becomes the "H" level only while the burst signal $S_m$ appears. When the burst signal $S_m$ does not appear, the switch SW becomes on. During this time, the capacitor C is charged by the output of the subtractor 14.

When the burst signal $S_m$ is stopped, the switch SW becomes off and the charged level of the capacitor C is held as it is until the next burst signal $S_m$ appears. Accordingly, the gain of the variable attenuator 12 will not become maximum during a non-signal period between burst signals. That is, as shown in FIG. 2A, the head level of the burst signals ($S_m$) will never increase to an extreme.

According to the conventional transmitter shown in FIG. 3, an ideal burst signal waveform without a head peak, shown in FIG. 2B as the output modulated wave $S_m$, can be obtained.

In this conventional transmitter 10, however, when the power is turned on or the non-signal period between burst signals becomes long, the desired burst signal waveform (FIG. 2B) cannot be obtained as an output modulated wave $S_m$ and a head peak appears. This is because in both of the above cases, the capacitor C discharges and the gain of the variable attenuator 12 is made maximum.

The present invention provides a transmitter having an automatic level control function which can reliably prevent a large peak level at the head of the burst signals (modulated output). It will be explained in further detail below.

Figure 4:
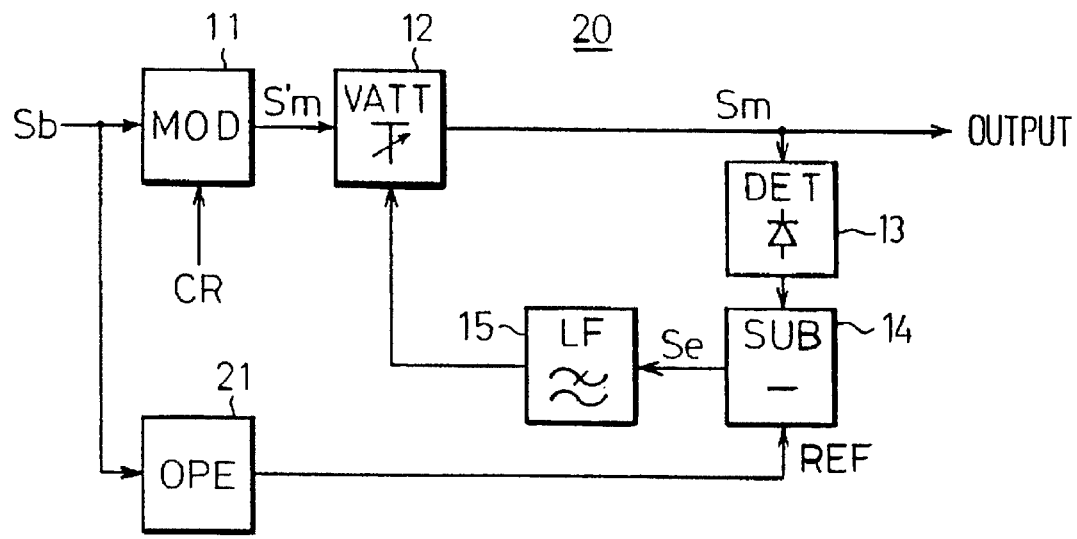
FIG. 4 is a view showing the basic constitution of the transmitter according to the present invention.

FIG. 4 is a view showing the basic constitution of the transmitter according to the present invention. As shown in the figure, according to the transmitter 20 of the present invention, provision is made of an operating unit (OPE: OPERATION) 21 which receives as input a baseband signal $S_b$ and applies to the input baseband signal $S_b$ an operation for matching with the detection characteristic of the detector 13. A reference level REF is given to the subtractor 14 from the operating unit 21.

Taking note of the fact that there is always a baseband signal $S_b$ forming the wave to be modulated, assuming that an output modulated wave $S_m$ forming the burst signal is transmitted, the reference level REF is made to be produced in timing with the appearance of this baseband signal $S_b$.

The waveform of the reference level REF produced preferably is the same or similar to the waveform of the detected output of the modulated wave $S_m$ obtained through the detector 13. If there is deviation between these waveforms, an accurate automatic level control could not be performed. Therefore, provision is made of the operating unit 21 which applies an operation for matching with the detection characteristic of the detector 13 to the baseband signal $S_b$, then the reference level REF is made.

Figure 5:
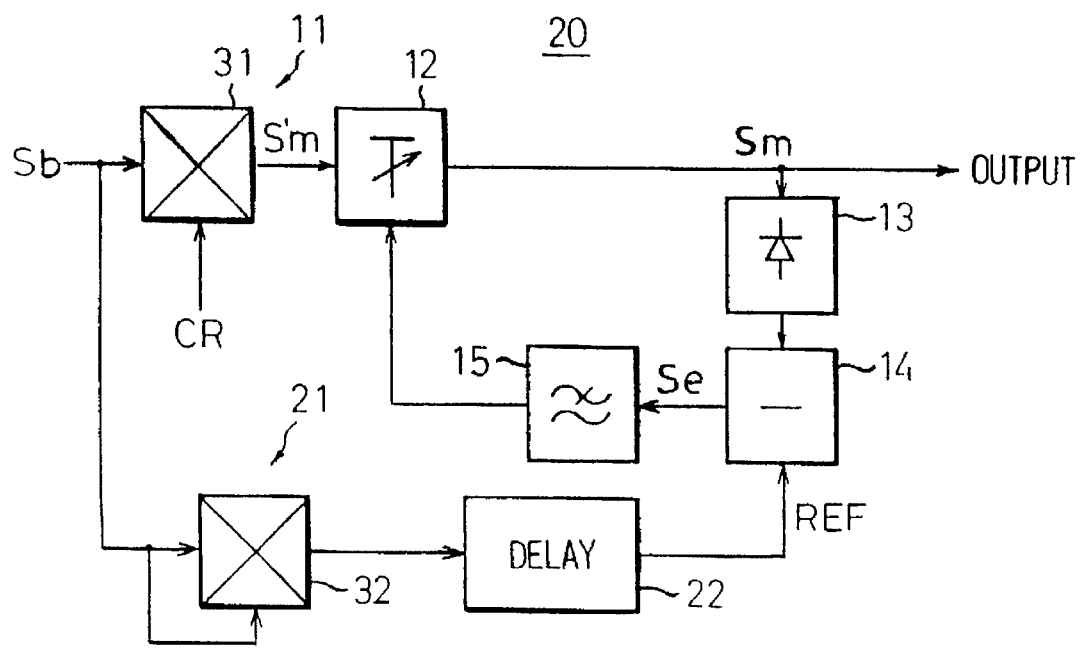
FIG. 5 is a view showing a first embodiment according to the present invention.
Figure 6:
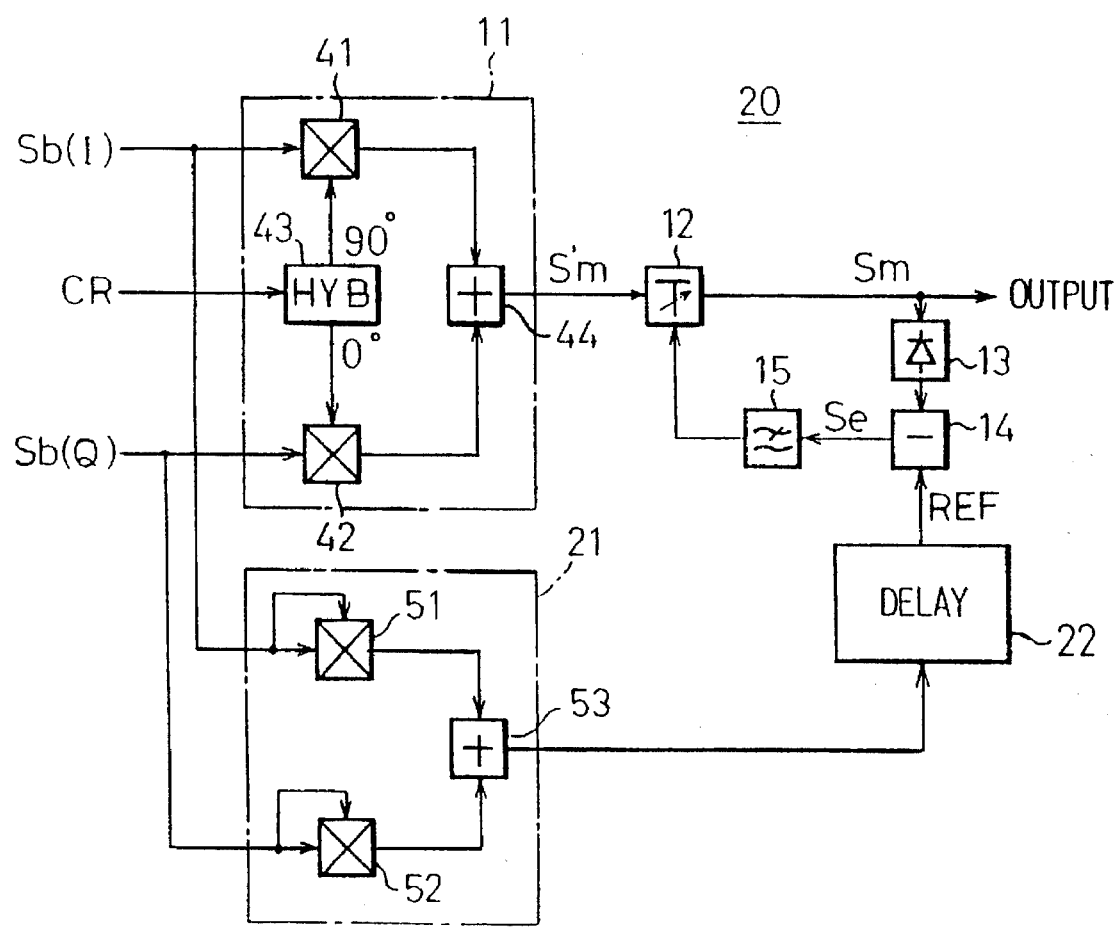
FIG. 6 is a view showing a second embodiment according to the present invention.

FIG. 5 is a view showing a first embodiment according to the present invention, and FIG. 6 is a view showing a second embodiment according to the present invention.

The first embodiment (FIG. 5) shows the case where the modulator 11 performs binary phase shift keying (PSK) modulation. The modulator 11 is constituted by a single mixer 31 for receiving a baseband signal $S_b$ and carrier CR.

The second embodiment (FIG. 6) shows the case where the modulator 11 performs quadrature PSK modulation. The modulator 11 is constituted by an I (in-phase)-channel mixer 41 and Q (quadrature)-channel mixer 42 which receive as input respectively an I-channel baseband signal $S_b(I)$ and Q-channel baseband signal $S_b(Q)$, a 90° hybrid circuit (HYB) 43 for supplying carriers shifted in phase by 90° with each other to the I-channel and Q-channel mixers 41 and 42, and an adder circuit 44 for combining the outputs of the I-channel and Q-channel mixers 41 and 42.

Next, an explanation will be made of the operating unit 21, the main constituent element in the first and second embodiments. As mentioned before, the construction of the operating unit 21 depends on the detection characteristic of the detector 13.

Figure 7:
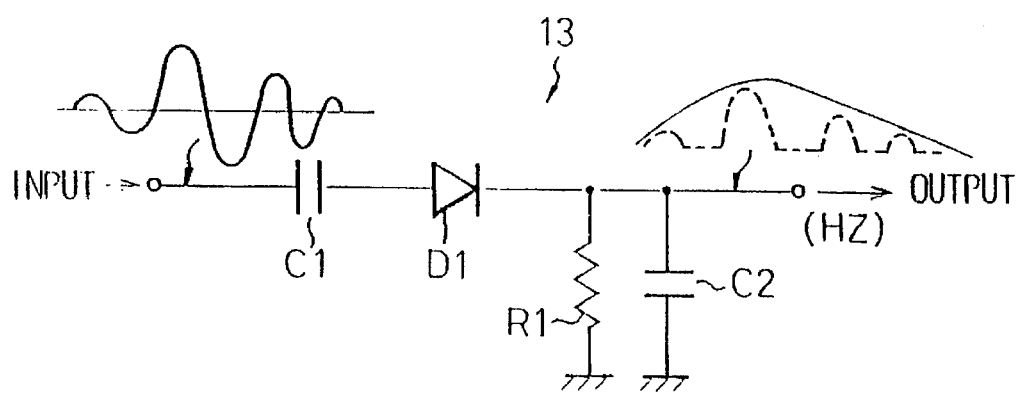
FIG. 7 is a view showing an example of the constitution of a detector having an envelope detection characteristic.

FIG. 7 is a view showing an example of the constitution of a detector having an envelope detection characteristic. In FIG. 7, C1 and C2 are capacitors, R1 is a resistor, and D1 is a diode. Usually, the output is received with a high impedance (Hz) to obtain the detection output.

In this way, when the detector 113 has an envelope detection characteristic, the operating unit 21 performs an operation for finding the envelope value for the input baseband signals $S_b$, $S_b(I)$, and $S_b(Q)$.

Figure 8:
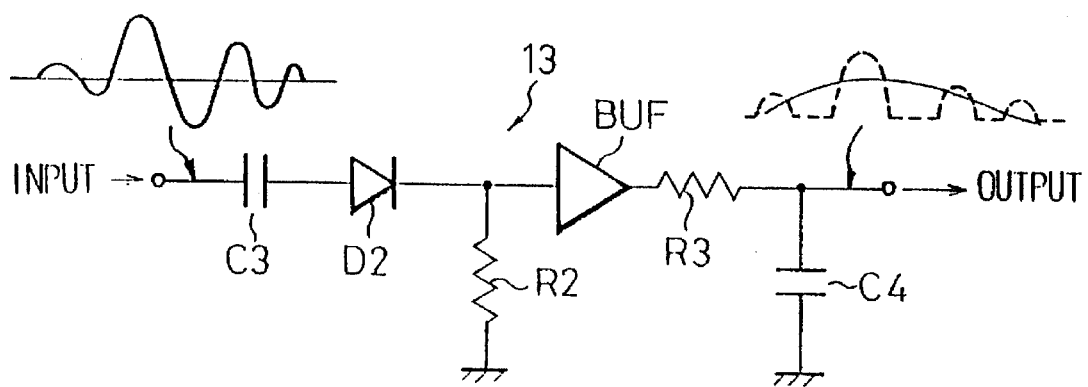
FIG. 8 is a view showing an example of the constitution of a detector having an effective value detection characteristic.

FIG. 8 is a view showing an example of the constitution of a detector having an effective value detection characteristic. In FIG. 8, C3 and C4 are capacitors, R2 and R3 are resistors, D2 is a diode, and BUF is a voltage buffer.

When the detector 13 has an effective value detection characteristic in this way, the operating unit 21 performs an operation to find the absolute values of the input baseband signals $S_b$, $S_b(I)$, and $S_b(Q)$ and find the square root of the absolute values.

In the first embodiment (FIG. 5), the detector 13 has an envelope detection characteristic (FIG. 7). The operating unit 21 in this case is constituted by a square circuit 32.

In the second embodiment (FIG. 6), the detector 13 has an envelope detection characteristic (FIG. 7). The operating unit 21 in this case is constituted by an I-channel square circuit 51 and Q-channel square circuit 52, provided corresponding to the I-channel baseband signal $S_b(I)$ and Q-channel baseband signal $S_b(Q)$, and an adder circuit 53 for combining the outputs of the I-channel and Q-channel square circuits 51 and 52.

Figure 9:
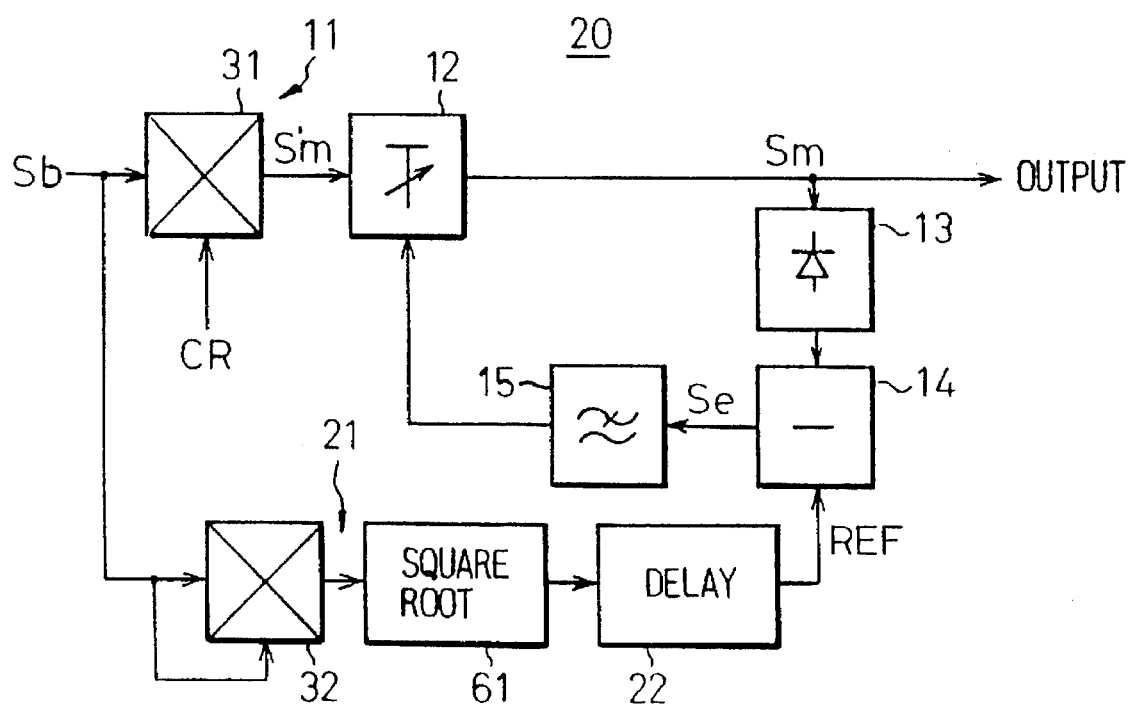
FIG. 9 is a view showing a third embodiment according to the present invention.
Figure 10:
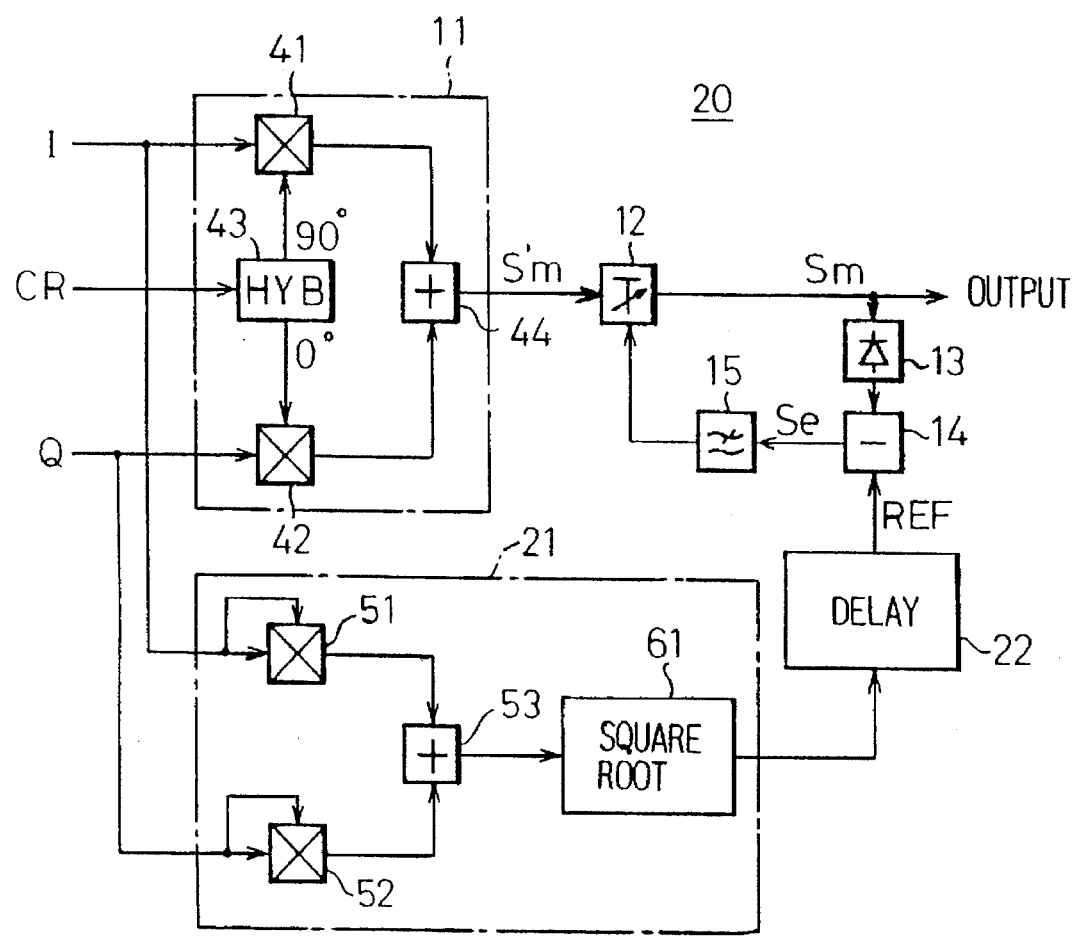
FIG. 10 is a view showing a fourth embodiment according to the present invention.

FIG. 9 is a view showing a third embodiment according to the present invention; and FIG. 10 is a view showing a fourth embodiment according to the present invention.

In the third embodiment (FIG. 9), the detector 13 has an effective value detection characteristic (FIG. 8). The operating unit 21 in this case is constituted by a square circuit 32 and a square root circuit 61 provided at the output side of the same.

In the fourth embodiment (FIG. 10), the detector 13 has an effective value detection characteristic (FIG. 8). The operating unit 21 in this case is constituted by an I-channel square circuit 51 and Q-channel square circuit 52 provided corresponding to the baseband signal $S_b(I)$ of the I-channel and the baseband signal $S_b(Q)$ of the Q-channel, an adder circuit 53 for combining the outputs of the I-channel and Q-channel square circuits, and a square root circuit 61 provided at the output side of the adder circuit 53.

In the above embodiments, more preferably a delay circuit 22 is inserted between the operating unit 21 and the subtractor 14. In all the embodiments, provision is made of a modulator 11 at the portion receiving the baseband signal $S_b$. The modulator 11 usually contains a band limitation filter inside it. When this filter is passed, a transmission delay results. This being the case, referring to FIG. 5, for example, a deviation occurs between the time until the input baseband signal $S_b$ passes through the modulator 31, variable attenuator 12, and detector 13 and reaches the subtractor 14 and the time until the baseband signal $S_b$ passes through the operating unit 21 and reaches the subtractor 14 as the REF. To minimize the deviation, provision is made of the above-mentioned delay circuit 22. However, if the operating time at the operating unit 21 becomes longer, the delay circuit 22 is unnecessary.

The operating unit 21 introduced by the present invention is constituted by a square circuit, an adder circuit, and a square root circuit. These circuits are not easy to realize as analog circuits, but in recent years the trend has been to form the major parts of transmitters by LSI's, so the processing in the transmitters has been digitalized as well. Accordingly, the square circuit, adder circuit, square root circuit, and almost all other components can be easily realized by digital circuits.

As explained above, according to the present invention, a transmitter is realized which is free from the occurrence of a peak with a large level at the head of the burst signals (modulated signals $S_m$).

What is claimed is:

1. A transmitter comprising:
    a modulator for modulating a carrier by a baseband signal and providing a modulated wave output,
    a variable attenuator for performing level control on the modulated wave output from said modulator and outputting a controlled modulated wave output, that is controlled to a certain level by a certain transmission power,
    a detector for detecting the level of the controlled modulated wave output from said variable attenuator, and
    a subtractor for receiving as input a detected level output from said detector and a reference level corresponding to said certain transmission power and outputting an error signal between these levels, and
    a loop filter for feeding back said error signal to said variable attenuator with a predetermined loop characteristic; and
    an operating unit for receiving as input said baseband signal and performing on the thus received baseband signal an operation for matching with the detection characteristic of said detector, the detection characteristic of said detector being known and incorporated beforehand into said operating unit,
    said reference level being a signal output from the operating unit to the subtractor.

2. A transmitter as set forth in claim 1, wherein when the detector has an envelope detection characteristic, the operating unit performs an operation for finding the envelope value on the input baseband signals.

3. A transmitter as set forth in claim 1, wherein when the detector has an effective value detection characteristic, the operating unit performs on the input baseband signal an operation for finding the absolute value of the same and further finding the square root of the absolute value.

4. A transmitter as set forth in claim 1, wherein a delay circuit is inserted between said operating unit and said subtractor.

5. A transmitter comprising:
    a modulator for modulating a carrier by a baseband signal, and providing a modulated wave output,
    a variable attenuator for performing level control on the modulated wave output from said modulator and outputting a controlled modulated wave output, that is controlled to a certain level by a certain transmission power,
    a detector for detecting the level of the controlled modulated wave output from said variable attenuator, and
    a subtractor for receiving as input a detected level output from said detector and a reference level corresponding to said certain transmission power and outputting an error signal between these levels, and
    a loop filter for feeding back said error signal to said variable attenuator with a predetermined loop characteristic; and
    an operating unit for receiving said baseband signal and performing on the thus received baseband signal an operation for matching with the detection characteristic of said detector, the detection characteristic of said detector being known and incorporated beforehand into said operating unit, said reference level being a signal output from the operating unit to the subtractor,
    when the detector has an envelope detection characteristic, the operating unit performs an operation for finding the envelope value on the input baseband signals, and
    when the modulator performs binary PSK modulation, the modulator includes a single mixer for receiving as input said baseband signal and said carrier and the operating unit includes a square circuit.

6. A transmitter comprising:
    a modulator for modulating a carrier by a baseband signal, and providing a modulated wave output,
    a variable attenuator for performing level control on the modulated wave output from said modulator and outputting a controlled modulated wave output, that is controlled to a certain level by a certain transmission power,
    a detector for detecting the level of the controlled modulated wave output from said variable attenuator, and
    a subtractor for receiving as input a detected level output from said detector and a reference level corresponding to said certain transmission power and outputting an error signal between these levels, and
    a loop filter for feeding back said error signal to said variable attenuator with a predetermined loop characteristic; and
    an operating unit for receiving said baseband signal and performing on the baseband signal an operation for matching with the detection characteristic of said detector, the detection characteristic of said detector being known and incorporated beforehand into said operating unit, said reference level being a signal output from the operating unit to the subtractor, said detector having an effective value detection characteristic, the operating unit performing on the input baseband signal an operation for finding the absolute value of the detection characteristic and further finding the square root of the absolute value, when the modulator performs binary PSK modulation, the modulator includes a single mixer for receiving as input said baseband signal and said carrier, and the operating unit includes a square circuit and a square root circuit provided at the output side of the square circuit.

7. A transmitter comprising:

a modulator for modulating a carrier by a baseband signal, and providing a modulated wave output, a variable attenuator for performing level control on modulated wave output from said modulator and outputting a controlled modulated wave output, that is controlled to a certain level by a certain transmission power, a detector for detecting the level of the controlled modulated wave output from said variable attenuator, and a subtractor for receiving as input a detected level output from said detector and a reference level corresponding to said certain transmission power and outputting an error signal between these levels, and a loop filter for feeding back said error signal to said variable attenuator with a predetermined loop characteristic; and an operating unit for receiving said baseband signal and performing on the baseband signal an operation for matching with the detection characteristic of said detector, the detection characteristic of said detector being known and incorporated beforehand into said operating unit, said reference level being a signal output from the operating unit to the subtracter, when the detector has an envelope detection characteristic, the operating unit performs an operation for finding the envelope value on the input baseband signals, and when the modulator performs quadrature PSK modulation, the modulator includes an I (in-phase)-channel mixer and Q (quadrature)-channel mixer which receive as input respectively an I-channel baseband signal and Q-channel baseband signal, a 90° hybrid circuit for supplying carriers shifted in phase by 90° with each other to the I-channel and Q-channel mixers, and an adder circuit for combining the outputs of the I-channel and Q-channel mixers and the operating unit includes an I-channel square circuit and Q-channel square circuit, corresponding to the I-channel baseband signal and Q-channel baseband signal, and an adder circuit for combining the outputs of the I-channel and Q-channel square circuits.

8. A transmitter comprising:

a modulator for modulating a carrier by a baseband signal, and providing a modulated wave output, a variable attenuator for performing level control on the modulated wave output from said modulator and outputting a controlled modulated wave output, that is controlled to a certain level by a certain transmission power, a detector for detecting the level of the controlled modulated wave output from said variable attenuator, and a subtractor for receiving as input a detected level output from said detector and a reference level corresponding to said certain transmission power and outputting an error signal between these levels, and a loop filter for feeding back said error signal to said variable attenuator with a predetermined loop characteristic; and an operating unit for receiving said baseband signal and performing on the baseband signal an operation for matching with the detection characteristic of said detector, the detection characteristic of said detector being known and incorporated beforehand into said operating unit, said reference level being a signal output from the operating unit to the subtracter, said detector having an effective value detection characteristic, the operating unit performing on the input baseband signal an operation for finding the absolute value of the detection characteristic and further finding the square root of the absolute value, when the modulator performs quadrature PSK modulation, the modulator includes an I-channel mixer and Q-channel mixer which receive as input respectively an I-channel baseband signal and Q-channel baseband signal, a 90° hybrid circuit for supplying carriers shifted in phase by 90° with each other to the I-channel and Q-channel mixers, and an adder circuit for combining the outputs of the I-channel and Q-channel mixers and the operating unit includes an I-channel square circuit and Q-channel square circuit, corresponding to the I-channel baseband signal an Q-channel baseband signal, an adder circuit for combining the outputs of the I-channel and Q-channel square circuits, and a square root circuit provided at the output side of the adder circuit.

* * * * *